(12) United States Patent
Smith

(10) Patent No.: US 11,359,127 B2
(45) Date of Patent: Jun. 14, 2022

(54) DICYCLOPENTADIENE AS AN OIL SWELLABLE PACKER MATERIAL

(71) Applicant: Halliburton Energy Services, Inc., Houston, TX (US)

(72) Inventor: Charles Timothy Smith, Edgewood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/661,043

(22) Filed: Oct. 23, 2019

(65) Prior Publication Data

US 2021/0122965 A1    Apr. 29, 2021

(51) Int. Cl.
  *E21B 33/12*   (2006.01)
  *C09K 8/42*    (2006.01)

(52) U.S. Cl.
  CPC .............. *C09K 8/426* (2013.01); *E21B 33/12* (2013.01)

(58) Field of Classification Search
  CPC ................................ C09K 8/426; E21B 33/12
  See application file for complete search history.

(56) References Cited

U.S. PATENT DOCUMENTS

| | | | | |
|---|---|---|---|---|
| 4,921,047 A | * | 5/1990 | Summers | E21B 43/025 166/276 |
| 7,373,991 B2 | * | 5/2008 | Vaidya | C08C 19/00 166/179 |
| 2009/0229816 A1 | * | 9/2009 | Lemme | E21B 33/1216 166/179 |
| 2011/0284248 A1 | * | 11/2011 | Zamora | E21B 33/13 166/387 |
| 2013/0096038 A1 | * | 4/2013 | Kim | C08K 5/14 507/221 |
| 2015/0060069 A1 | * | 3/2015 | Potapenko | E21B 33/138 166/284 |
| 2017/0015824 A1 | | 1/2017 | Gozalo et al. | |
| 2017/0356269 A1 | | 12/2017 | Denton | |
| 2018/0274326 A1 | | 9/2018 | Nedwed et al. | |
| 2018/0305996 A1 | | 10/2018 | Duan et al. | |
| 2019/0040694 A1 | * | 2/2019 | Smith | E21B 33/1208 |

FOREIGN PATENT DOCUMENTS

GB    2428264 A   *   1/2007   ......... E21B 33/1277

OTHER PUBLICATIONS

PCT Application No. PCT/US2019/057540, International Search Report and Written Opinion, dated Jul. 15, 2020, 11 pages.

* cited by examiner

*Primary Examiner* — Silvana C Runyan
(74) *Attorney, Agent, or Firm* — Kilpatrick Townsend & Stockton LLP

(57) ABSTRACT

At least a portion of a wellbore region can be sealed using a packer that includes a dicyclopentadiene (DCPD) polymeric resin. The resin can be molded onto a tubular. The DCPD packer can swell in response to being exposed to hydrocarbon fluid at a temperature greater than the glass transition temperature of the DCPD resin to seal an annular region between the tubular and the wall of the well or casing string.

20 Claims, 6 Drawing Sheets

450

DICYCLOPENTADIENE AS AN OIL SWELLABLE PACKER MATERIAL

TECHNICAL FIELD

The present disclosure relates generally to packer materials used in wellbore operations. More specifically, but not by way of limitation, this disclosure relates to polymeric packer materials in wellbore operations.

BACKGROUND

Completed oil wells may have undesired fluid flow paths that may be reduced or shut off using packers to seal the external annulus. Packers can include inflatable packers that involve injection of a fluid and elastomeric packers that react and swell when contacted by hydrocarbon fluids or water in the wellbore. Elastomeric packers may swell immediately upon exposure to the fluid and may include a barrier coating to delay the swelling of the packer until the packer has been inserted at the desired depth and well location.

DETAILED DESCRIPTION

Figure 1:
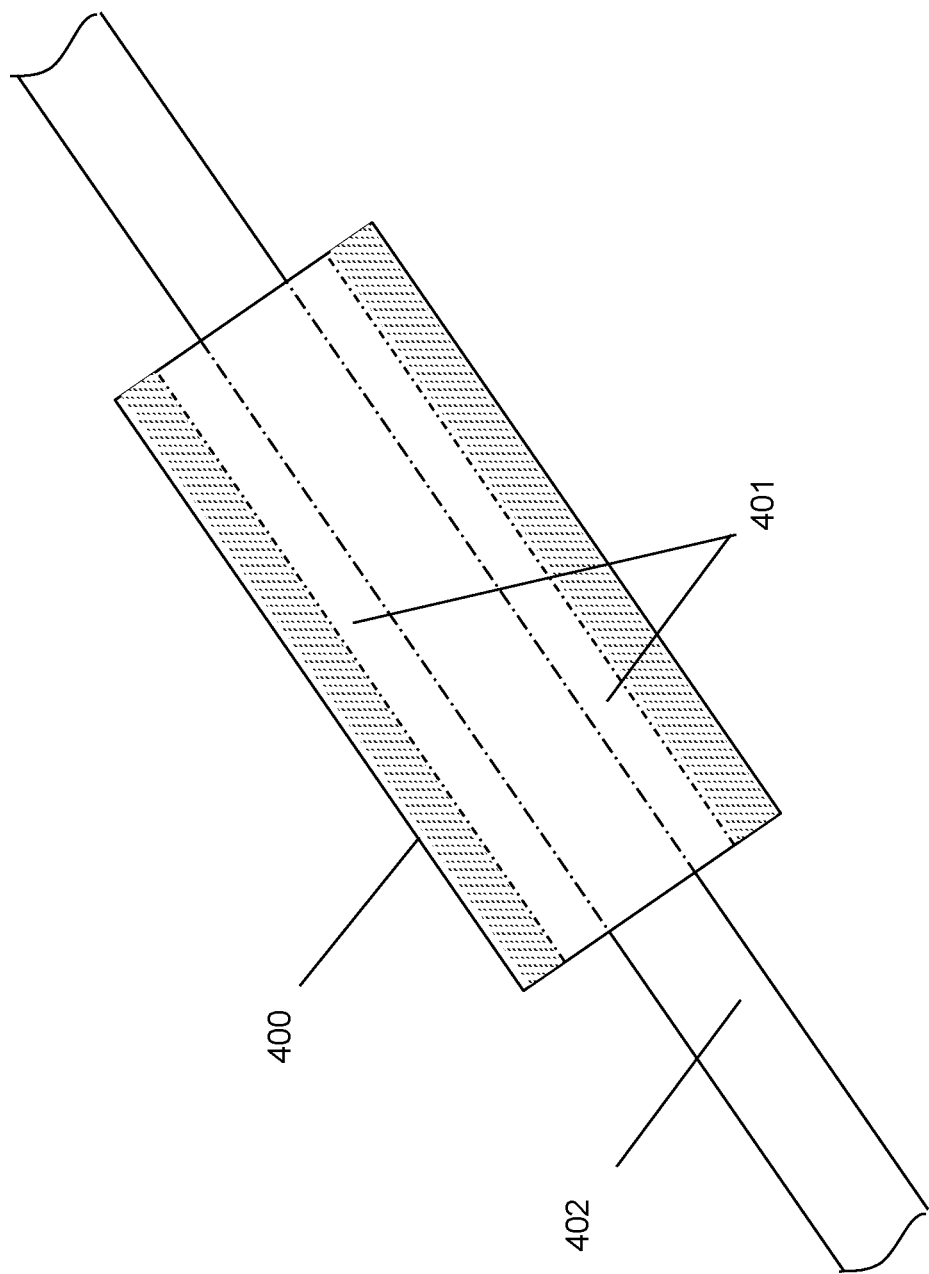
FIG. 1 is an illustrative schematic of a casting mold for an annular packer.

Certain aspects and features of the present disclosure relate to polymeric packers used in wellbore operations. Packers can provide an annular seal between a tubular and the wall of a wellbore upon completion of a reservoir section. A polymeric packer according to some examples can include dicyclopentadiene (DCPD) polymeric resins that can expand or swell when exposed to hydrocarbon fluids at elevated temperatures.

A polymeric packer can be an oil swellable packer using a DCPD resin or a modified DCPD resin. When raised above the glass transition temperature of the resin, DCPD is an olefin that can swell in the presence of hydrocarbon fluids. The degree of swell and the activation temperature can depend on other monomers that may be included in the packer such that the packer can be tailored to specific swell rates and activation temperatures. The packer can be a two-part liquid system and can be manufactured using low-pressure casting.

In some examples, the polymeric packer can expand or swell at temperatures greater than the glass transition temperature of the polymeric resin. The polymeric packer may not expand or swell during insertion into the wellbore and after exposure to a drilling fluid or completion fluid. The polymeric packer may not expand or swell during insertion into the wellbore and after exposure to a hydrocarbon fluid at a temperature below the glass transition temperature of the polymeric resin. These limited conditions for expansion or swelling of the polymeric packer can enable the polymeric packer to be placed at a desired depth or location with the wellbore without prematurely engaging and sealing of a region within the wellbore. And, the packer may be devoid of a barrier material and avoid barrier coats.

In some examples, a method for sealing at least a portion of a wellbore region can include introducing an annular packer that includes a DCPD polymeric resin into a wellbore, exposing the annular packer to a hydrocarbon fluid, and sealing an annular region of the wellbore with the annular packer. The annular region may be between a pipe or tubular and the wall of the well or formation. The temperature of the hydrocarbon fluid within the wellbore can exceed the glass transition temperature of the polymeric resin, and enable the polymeric packer to expand or swell upon exposure to the hydrocarbon fluid to seal an area of the wellbore.

Examples of polymeric resins can include DCPD thermoset resins that have a low viscosity and are highly moldable. Once a thermoset resin is cured, the polymeric component can remain in a hardened state. Thermoset resins can exhibit excellent chemical resistance, heat resistance, and structural integrity, including impact resistance. At temperatures above the glass transition temperature, thermoset resins can become soft and flexible, and polymer chains can become mobile. The increased mobility can enable the polymer chains to react with a hydrocarbon fluid, resulting in an expansion of the polymeric resin.

In some examples, the temperature of the hydrocarbon fluid in the wellbore exceeds the glass transition temperature of the polymeric resin. The temperature of the hydrocarbon fluid in the wellbore can range between from about 130° C. to about 300° C. For example, the temperature of the hydrocarbon fluid may be about 130° C., about 135° C., about 140° C., about 145° C., about 150° C., about 155° C., about 160° C., about 165° C., about 170° C., about 175° C., about 180° C., about 185° C., about 190° C., about 195° C., about 200° C., about 205° C., about 210° C., about 215° C., about 220° C., about 225° C., about 230° C., about 235° C., about 240° C., about 245° C., about 250° C., about 255° C., about 260° C., about 265° C., about 270° C., about 275° C., about 280° C., about 285° C., about 290° C., about 295° C., or about 300° C.

In some cases, a monomer or a plasticizer may be added to the resin to lower the glass transition temperature of the resin. The monomers can include norbornene, ethylene, propylene, styrene, butadiene, cyclopentene, cycloheptene, or cyclooctene, and their derivatives which are active with the use of a Grubbs catalyst system. Plasticizers may include paraffinic oil, naphthenic oil, aromatic oil, polybutadiene, adducted polybutadiene, ethylene-propylene copolymers, adducted ethylene-propylene copolymers, ethylene-propylene-diene terpolymers or adducted ethylene-propylene-diene terpolymers.

An annular packer according to some examples can be provided by casting the annular packer on a tubular prior to introducing the annular packer into the wellbore. Casting the annular packer can include combining a DCPD polymeric resin with a catalyst to form a resin mixture, supplying the resin mixture to a casting mold, and curing the resin mixture to form the annular packer. FIG. 1 depicts a casting mold 400 according to one example of the present disclosure. The casting mold 400 may include an annular region 401 around a tubular 402. The casting mold may include at least one vent. In certain examples, the casting mold is filled from the bottom to ensure the annular packer is substantially free of voids. The resin may be cured at ambient conditions. As used herein, the meaning of "ambient conditions" can include temperatures of about room temperature, relative humidity of from about 20% to about 100%, and barometric pressure of from about 975 millibar (mbar) to about 1050 mbar. For example, relative humidity can be about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 100%, or anywhere in between. For example, barometric pressure can be about 975 mbar, about 980 mbar, about 985 mbar, about 990 mbar, about 995 mbar, about 1000 mbar, about 1005 mbar, about 1010 mbar, about 1015 mbar, about 1020 mbar, about 1025 mbar, about 1030 mbar, about 1035 mbar, about 1040 mbar, about 1045 mbar, about 1050 mbar, or anywhere in between. The DCPD resin for the packer may be substantially cured in less than about five hours. For example, the DCPD resin may be substantially cured in less than about four hours, less than about three hours, less than about two hours, or less than about one hour.

The cured DCPD packer can have good mechanical properties at ambient conditions. In some examples, the cured packer has a hardness of at least 50 Shore D. In certain examples, the cured packer has a hardness of at least 80 Shore D. For example, the cured packer may have a hardness of at least about 50 Shore D, about 51 Shore D, about 52 Shore D, about 53 Shore D, about 54 Shore D, about 55 Shore D, about 56 Shore D, about 57 Shore D, about 58 Shore D, about 59 Shore D, about 60 Shore D, about 61 Shore D, about 62 Shore D, about 63 Shore D, about 64 Shore D, about 65 Shore D, about 66 Shore D, about 67 Shore D, about 68 Shore D, about 69 Shore D, about 70 Shore D, about 71 Shore D, about 72 Shore D, about 73 Shore D, about 74 Shore D, about 75 Shore D, about 76 Shore D, about 77 Shore D, about 78 Shore D, about 79 Shore D, about 80 Shore D, about 81 Shore D, about 82 Shore D, about 83 Shore D, about 84 Shore D, about 85 Shore D, about 86 Shore D, about 87 Shore D, about 88 Shore D, about 89 Shore D, or about 90 Shore D.

In some examples, the cured packer has a tensile strength of at least 60 MPa. For example, the cured packer may have a tensile strength of at least about 60 MPa, about 61 MPa, about 62 MPa, about 63 MPa, about 64 MPa, about 65 MPa, about 66 MPa, about 67 MPa, about 68 MPa, about 69 MPa, about 70 MPa, about 71 MPa, about 72 MPa, about 73 MPa, about 74 MPa, about 75 MPa, about 76 MPa, about 77 MPa, about 78 MPa, about 79 MPa, or about 80 MPa. The cured packer can exhibit elongation over 10 percent. The properties of cross-linked DCPD can allow for a packer that is damage resistant at ambient conditions.

DCPD resins can exhibit good chemical resistance in environments that include salt water, diesel and crude oil, strong acids, and strong bases when the environmental temperature is below the glass transition temperature of the resin. At temperatures above the glass transition temperature of the resin, DCPD resins can be susceptible to reaction with diesel, crude oils, and other hydrocarbon fluids, causing the DCPD resin to expand or swell. A packer according to some examples can use the reaction of DPCD resins with hydrocarbon fluids at elevated temperatures to expand the DCPD resin to seal an annular region of a wellbore between a tubular and the wall of the well.

In some examples, a barrier coating can be added to the annular packer prior to introducing the annular packer into the wellbore. The barrier coating can modify the reaction of the DCPD resin with the hydrocarbon fluids in the wellbore. In other examples, no barrier coating is included with the annular packer.

Optionally, fillers and/or reinforcing fibers may be added to the DCPD resin, including fumed silica, precipitated silica, clay, functionalized clay, talc, functionalized talc, carbon black, graphite, PTFE, mineral fibers, carbon fibers, glass fibers and synthetic fibers. In certain examples, the reinforcement fibers can wick hydrocarbon fluids into the bulk DCPD resin to enhance swell speed.

Also described herein are articles of manufacture that include a DCPD resin. The article can include a DCPD resin cast in a mold to a form a desired shape or form. The article may be adapted to swell in a wellbore when exposed to a hydrocarbon fluid at temperatures between from about 130° C. to about 300° C. The polymeric resin can further include one or more monomers. In some examples, the monomers include one or more of norbornene, ethylene, propylene, styrene, butadiene, cyclopentene, cycloheptene, cyclooctene, or their derivatives.

In some examples, the article may be a packer. The packer may have a longitudinal axis and have an annular shape, with an inner diameter substantially similar to an outer diameter of a pipe or tubular. A packer may have a continuous length of about 0.5 m to about 10 m A packer may have a diameter of about 10 cm to about 40 cm.

Figure 2:
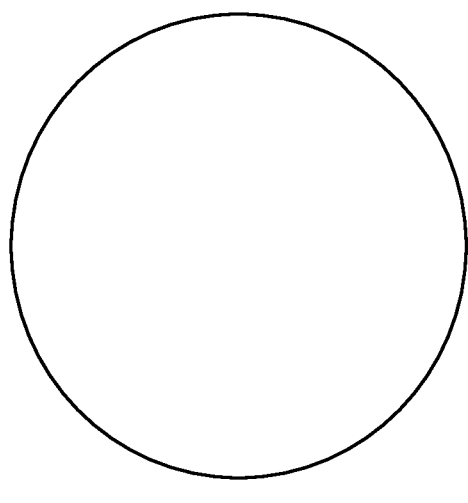
FIG. 2 is an illustrative schematic of a frac ball.
Figure 2:

In other examples, the article is a frac ball. FIG. 2 depicts a frac ball 450 according to one example of the present disclosure. A frac ball 450 may be substantially spherical in shape. A frac ball may have a diameter of about 2 cm to about 10 cm. For example, a frac ball may have a diameter of about 2 cm, about 3 cm, about 4 cm, about 5 cm, about 6 cm, about 7 cm, about 8 cm, about 9 cm, or about 10 cm. The moldable DCPD resin can eliminate the need for costly machining of frac balls to a specified shape and size tolerance.

An annular packer or frac ball can be made by combining a DCPD polymeric resin with a catalyst to form a resin mixture, supplying the resin mixture to a casting mold, and curing the resin mixture to form an annular packer or frac ball. In some examples, the casting mold includes an annular region around a tubular and at least one vent, and the packer is cured on the tubular.

Illustrative examples are given to introduce the reader to the general subject matter discussed herein and are not intended to limit the scope of the disclosed concepts. The following sections describe various additional features and examples with reference to the drawings in which directional descriptions are used to describe the illustrative aspects, but, like the illustrative aspects, should not be used to limit the present disclosure.

Figure 3:
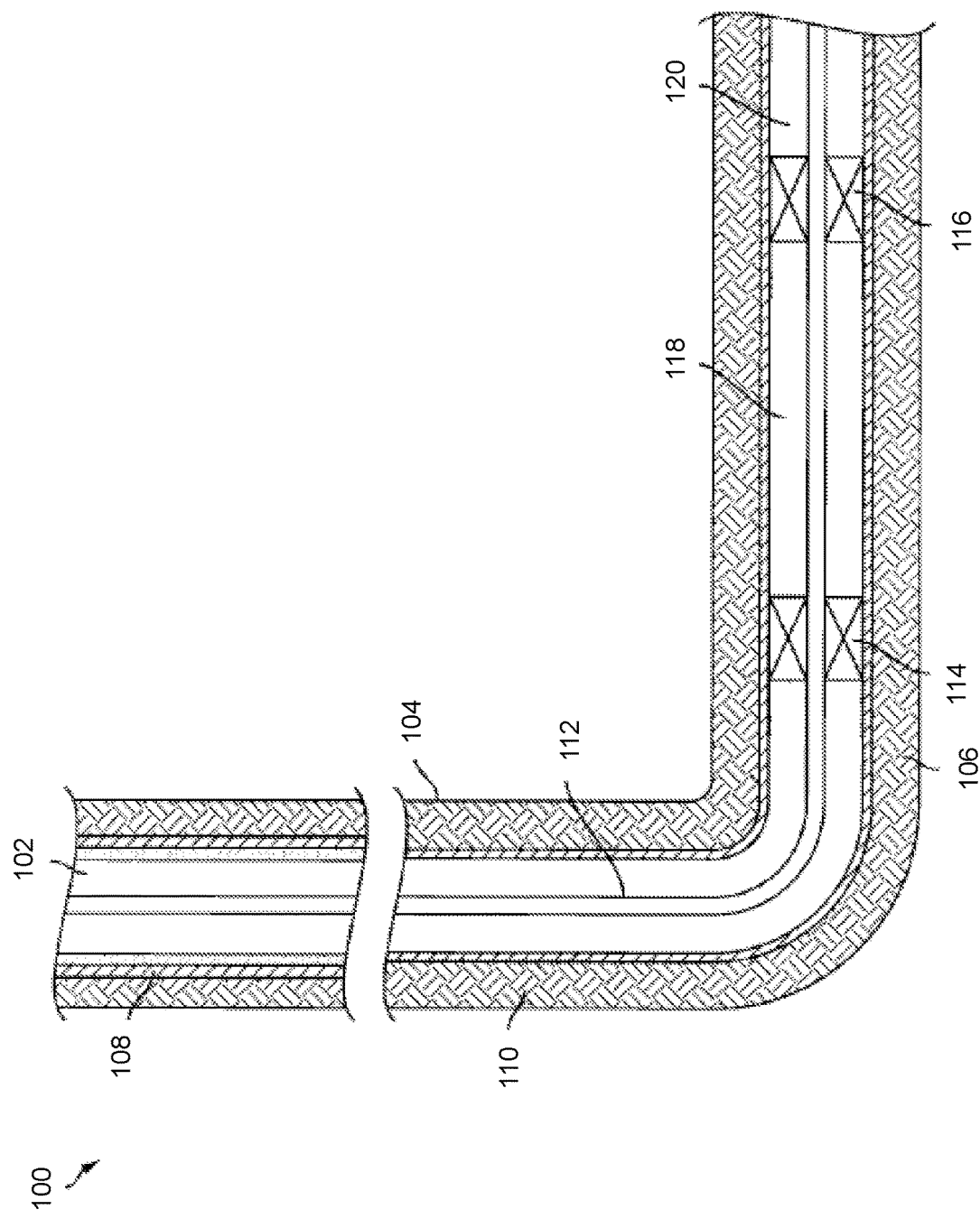
FIG. 3 is an illustrative schematic of a well system having packer assemblies according to one example of the present disclosure.

FIG. 3 depicts a well system 100 with packer assemblies according to one example of the present disclosure. The well system 100 includes a bore that is a wellbore 102 extending through various earth strata. The wellbore 102 has a substantially vertical section 104 and a substantially horizontal section 106. The substantially vertical section 104 and the substantially horizontal section 106 may include a casing string 108 cemented at an upper portion of the substantially vertical section 104. The substantially horizontal section 106 extends through a hydrocarbon bearing subterranean formation 110.

A tubing string 112 extends from the surface within wellbore 102. The tubing string 112 can provide a conduit for formation fluids to travel from the substantially horizontal section 106 to the surface. Packers 114, 116 are positioned with the tubing string 112 in the horizontal section 106. Other components (not shown), such as production tubular, screens, inflow control devices, can be positioned in the wellbore 102. Packers 114, 116 can provide annular seals between the tubing string 112 and the casing string 108 to define zones 118, 120. The packers 114, 116 can be polymeric packers that are formed using a DCPD resin. The packers 114, 116 can be in a run-in configuration—i.e., not expanded—while being positioned in the wellbore. Subsequent to being run to a desired position and in response to contact with a hydrocarbon fluid in the environment of the wellbore, the packers 114, 116 can expand to form pressure-isolated zones in the wellbore 102.

Although FIG. 3 depicts packers 114, 116 positioned in the substantially horizontal section 106, packers 114, 116 according to various examples of the present disclosure can be located, additionally or alternatively, in the substantially vertical section 104. Furthermore, any number of packers, including one, can be used. In some examples, packers 114, 116 can be disposed in simpler wellbores, such as wellbores having only a substantially vertical section.

Figure 4:
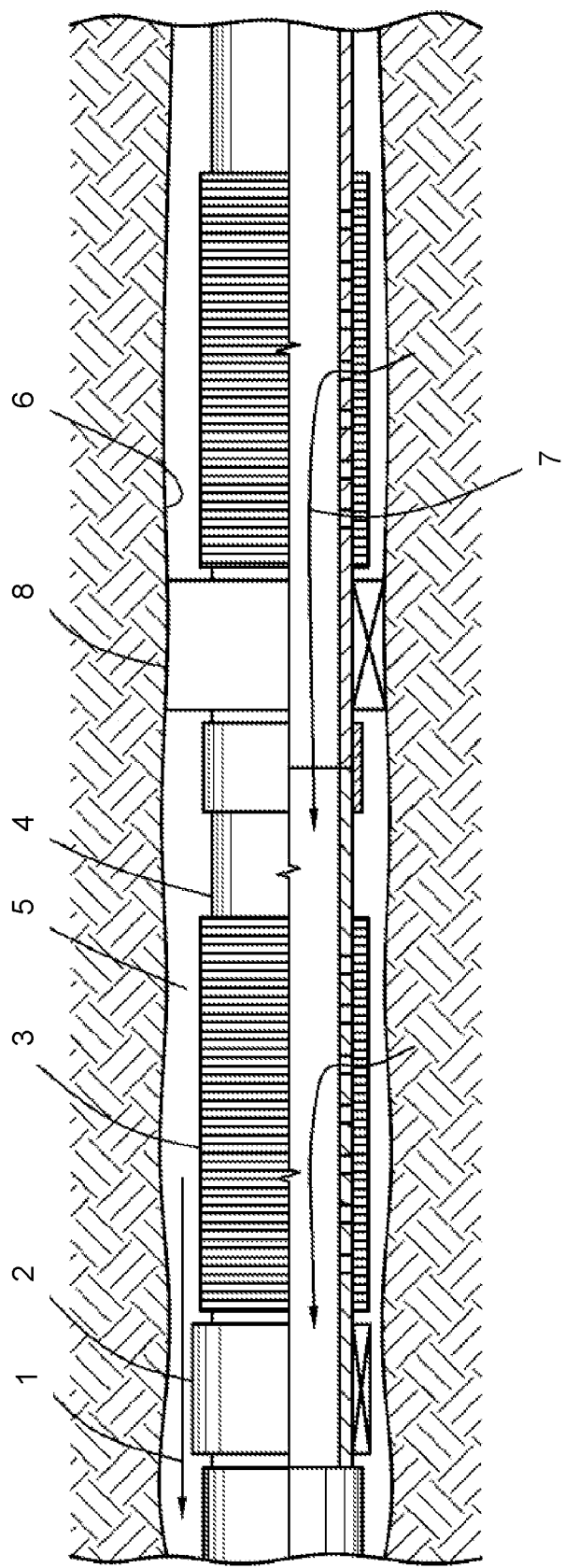
FIG. 4 is an illustrative schematic of a longitudinal section of a wellbore with a packer according to one example of the present disclosure.

FIG. 4 illustrates an annular packer 2 in a hydrocarbon production well according to one example of the present disclosure. The annular packer 2 may be an example of how one or more both packers 114, 116 from FIG. 3 can be configured. In some cases, the packer 2 may be positioned in the well on the outside of a tubular 4, which may be a production pipe or another type of tubular. In other cases, a packer 2 may be cast directly on the tubular 4 and then positioned in the well. The packer 2 may expand upon exposure to elevated temperatures and hydrocarbon fluids. The packer 2 can seal the annular space 5 between the tubular 4 and the well wall 6. A hydrocarbon stream 1 may flow past the packer element 2 prior to the packer element 2 expanding towards the well wall 6 to seal the annular space 5. As shown in FIG. 4, a packer element 8 may expand towards the well wall 6 and seal the annular space 5 and substantially prevent flow of well fluid 7 by the packer element 8. In certain examples, a sand control filter 3 may be attached to a tubular 4.

Figure 5:
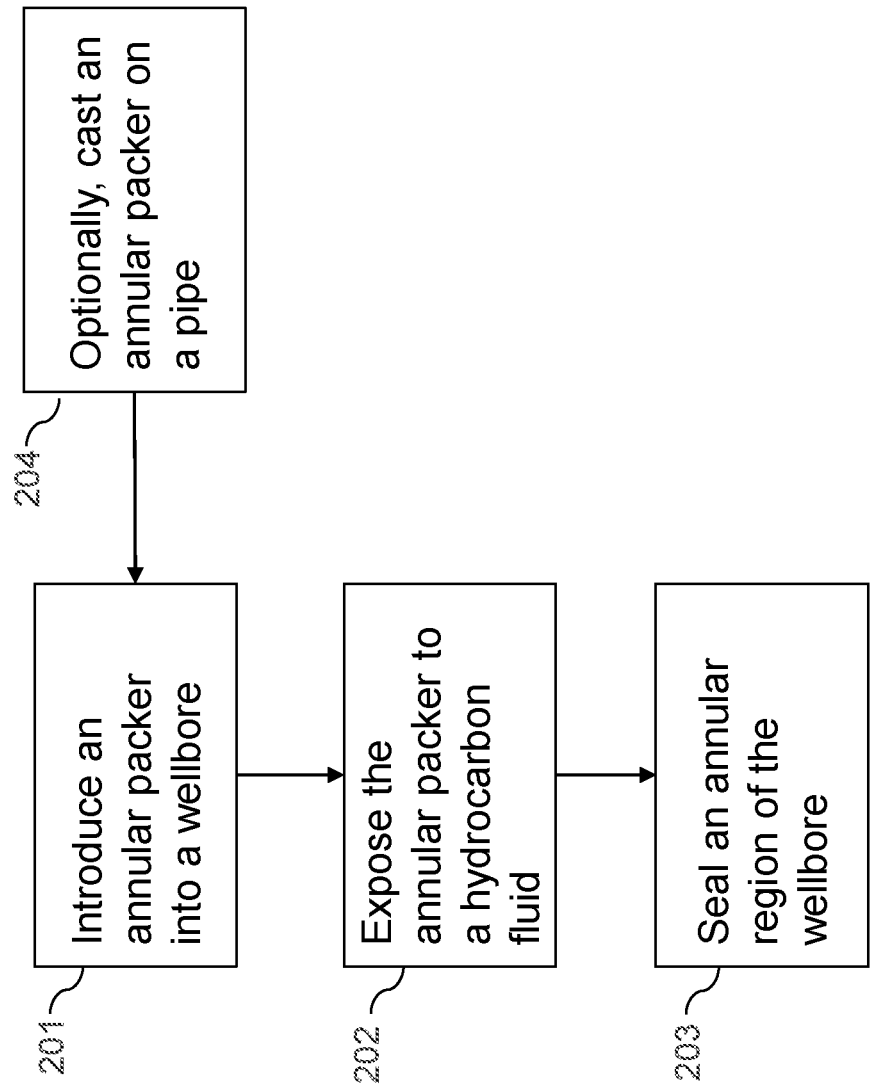
FIG. 5 is a flowchart diagram of a method of sealing an annular space in a wellbore using a packer according to one example of the present disclosure.

FIG. 5 is a flowchart diagram of a method for sealing at least a portion of a wellbore region according to one example of the present disclosure. In block 201 an annular packer is introduced into a wellbore. The packer includes a DCPD polymeric resin, where the DCPD polymeric resin swells in response to contact with a fluid in the wellbore.

In block 202, the annular packer is exposed to a hydrocarbon fluid. The temperature of the hydrocarbon fluid can range between from about 130° C. to about 300° C., and exceed the glass transition temperature of the DCPD polymeric resin.

In block 203, an annular region of the wellbore is sealed. The annular region being between a pipe or tubular and the wall of the well or casing string. The seal of the packer reduces or eliminates undesired fluid flow paths within the wellbore.

In block 204, the annular packer is optionally case on a tubular prior to being introduced into a wellbore.

Figure 6:
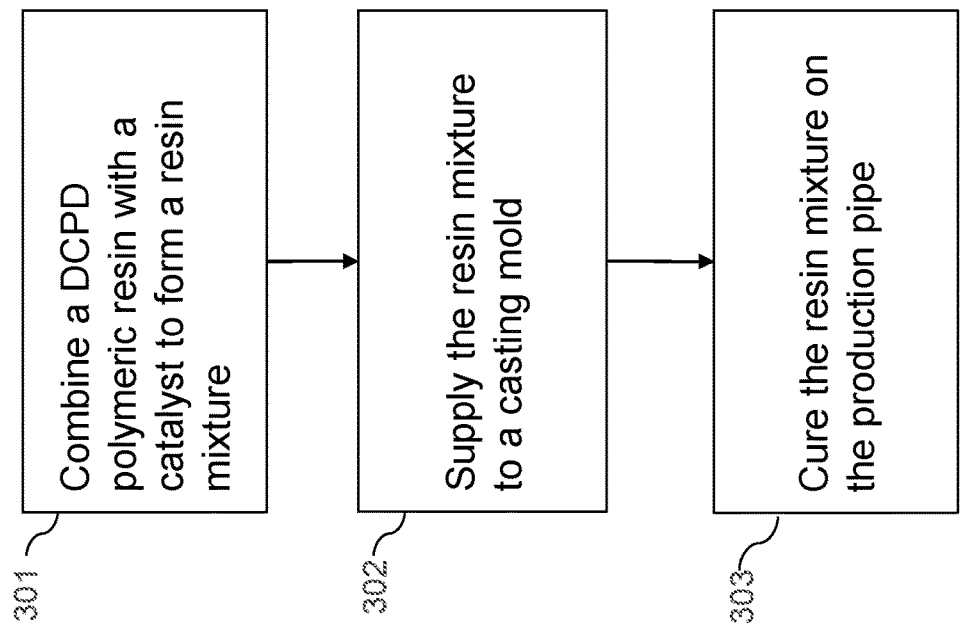
FIG. 6 is a flowchart diagram of a method of making an annular packer according to one example of the present disclosure.

FIG. 6 is a flowchart diagram of a method for making a packer according to one example of the present disclosure. In block 301, a DCPD polymeric resin is combined with a catalyst to form a resin mixture. The two-part liquid resin mixture can include up to 10 weight percent catalyst.

In block 302, the resin mixture is supplied to a casting mold. Low pressure casting can be used. The material of the casting mold can include an aluminum alloy, a steel alloy, a copper alloy, brass, lead, or glass. In some examples, thermoset resins including epoxy, polyester, silicone, plaster, clay, and cement, and composites based on these resins can be used for the mold. In other examples, thermoplastic resins including PEEK, PEI, PPA, PPS, as well as structural engineered compounds based on these resins, can be used for the mold.

In block 303, the resin mixture is cured on the tubular in the mold. The packer may be cast to a final dimension that does not need machining. The resin mixture can be cured at ambient conditions.

Examples

Example 1: Swell Test

Samples of four DCPD resins were prepared according to ASTM D-395, Type I and the resin manufacturer instructions. The samples were aged at an elevated temperature in a hydrocarbon solvent (Perchem 1150, available from Perkins Products Inc.) to determine the degree of swelling. Perchem 1150 is a petroleum distillate, and was used as a control oil in the testing. The degree of swelling was determined by measuring the diameter and height of each test disc before and after exposure to the hydrocarbon solvent. The results of the swell tests are provided in Table 1.

TABLE 1

| Sample | 1 | 2 | 3 | 4 |
| --- | --- | --- | --- | --- |
| Material | Resin 1 | Resin 2 | Resin 2 | Resin 3 |
| Solvent Temp., ° C. | 200 | 200 | 200 | 200 |
| Resin Tg, ° C. | 138 | 176 | 176 | 180 |
| Test duration (Days) | 42 | 42 | 7 | 20 |
| Original diameter (in) | 1.104 | 1.103 | 1.101 | 1.093 |
| Original height (in) | 0.508 | 0.509 | 0.499 | 0.5 |
| Original volume (in$^3$) | 0.4863 | 0.4864 | 0.4751 | 0.4691 |
| Aged diameter (in) | 1.095 | 1.097 | 1.105 | 1.098 |
| Aged height (in) | 0.598 | 0.56 | 0.538 | 0.683 |
| Aged volume (in$^3$) | 0.5631 | 0.5293 | 0.5159 | 0.6467 |
| Volume change (%) | 15.81 | 8.83 | 8.60 | 37.85 |
| Height change (%) | 17.72 | 10.02 | 7.82 | 36.60 |

Example 2: Chemical Resistance

A sample of a DCPD resin (Proxima® HPR 2124, available from Materia, Inc., Pasadena, Calif.) having a hardness of 85 Shore D and a tensile strength of 63 MPa was prepared. The sample as aged in diesel fuel for 24 hours at 150° C. The compressive strength of the resin sample was measured before and after testing. A decrease of about 4 percent in the compressive strength was observed in the aged sample as compared to the sample prior to aging. The glass transitions temperature of the resin was 179° C., below the temperature of the diesel.

In some aspects, methods and apparatus for a polymeric packer are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a method comprising: introducing an annular packer comprising a dicyclopentadiene polymeric resin into a wellbore; exposing the annular packer to a hydrocarbon fluid; and sealing an annular region of the wellbore with the annular packer.

Example 2 is the method of example(s) 1, wherein a temperature of the hydrocarbon fluid exceeds the glass transition temperature of the dicyclopentadiene polymeric resin.

Example 3 is the method of example(s) 1 or 2, wherein the temperature of the hydrocarbon fluid ranges between from 130° C. to 300° C.

Example 4 is the method of any one of example(s) 1-3, wherein the polymeric resin further comprises one or more monomers.

Example 5 is the method of example(s) 4, wherein the monomers comprise at least one of norbornene, ethylene, propylene, styrene, butadiene, cyclopentene, cycloheptene, cyclooctene, or their derivatives.

Example 6 is the method of any one of example(s) 1-5, wherein the annular packer swells in response to exposure to the hydrocarbon fluid.

Example 7 is the method of any one of example(s) 1-6, further comprising: casting the annular packer on a tubular prior to introducing the annular packer with the tubular into the wellbore.

Example 8 is the method of example(s) 7, wherein casting the annular packer comprises: combining a polymeric resin with a catalyst to form a resin mixture; supplying the resin mixture to a casting mold, wherein the casting mold comprises an annular region around the tubular and at least one vent; and curing the resin mixture to form the annular packer.

Example 9 is the method of example(s) 8, wherein curing of the resin mixture is performed at ambient conditions.

Example 10 is the method of example(s) 8 or 9, wherein the packer is cured in less than 5 hours.

Example 11 is the method of any one of example(s) 8-10, wherein the cured packer has a hardness of at least 50 Shore D.

Example 12 is a packer comprising: a tubular positionable in a wellbore; and a dicyclopentadiene polymeric resin annularly around a portion of the tubular, the dicyclopentadiene polymeric resin being swellable in response to contact with a hydrocarbon fluid in the wellbore.

Example 13 is the packer of example(s) 12, wherein the dicyclopentadiene polymeric resin is swellable in response to contact with the hydrocarbon fluid at a temperature in a range of 130° C. to 300° C. in the wellbore.

Example 14 is the packer of example(s) 12 or 13, further comprising a monomer that is at least one of norbornene, ethylene, propylene, styrene, butadiene, cyclopentene, cycloheptene, cyclooctene, or their derivatives for changing a temperature of fluid at which the packer is swellable.

Example 15 is the packer of any one of example(s) 12-14, wherein the packer is devoid of any barrier and is swellable in the wellbore subsequent to running in the wellbore to a desired position to pressure-isolate areas in the wellbore.

Example 16 is the packer of any one of example(s) 12-15, wherein the dicyclopentadiene polymeric resin is formable around the portion of the tubular using a mold and a curing process at ambient temperature.

Example 17 is an article of manufacture comprising: a dicyclopentadiene polymeric resin cast in a mold, the article being swellable in a wellbore in response to exposure to a hydrocarbon fluid at temperatures between from 130° C. to 300° C.

Example 18 is the article of manufacture of example(s) 17, wherein the polymeric resin further comprises one or more monomers.

Example 19 is the article of manufacture of example(s) 17 or 18, wherein the monomers comprise at least one of norbornene, ethylene, propylene, styrene, butadiene, cyclopentene, cycloheptene, cyclooctene, or their derivatives.

Example 20 is the article of manufacture of any one of example(s) 17-20, wherein the article is a frac ball.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
casting an annular packer on a tubular, wherein casting the annular packer comprises:
preparing a two-part liquid resin mixture by combining a dicyclopentadiene polymeric resin with a catalyst;
supplying the two-part liquid resin mixture to a casting mold, wherein the casting mold comprises an annular region around the tubular;
curing the two-part liquid resin mixture at ambient conditions to form the annular packer, wherein the annular packer is cured in less than 5 hours; and
removing the annular packer from the casting mold;
introducing the annular packer into a wellbore;
exposing a dicyclopentadiene polymeric resin region of the annular packer to a hydrocarbon fluid having a temperature of from 130° C. to 300° C.; and
sealing an annular region of the wellbore with the dicyclopentadiene polymeric resin region of the annular packer.

2. The method of claim 1, further comprising increasing a temperature of the dicyclopentadiene polymeric resin region to above a glass transition temperature of the dicyclopentadiene polymeric resin to swell the dicyclopentadiene polymeric resin region of the annular packer with the hydrocarbon fluid.

3. The method of claim 2, wherein increasing the temperature of the dicyclopentadiene polymeric resin region comprises contacting the annular packer with the hydrocarbon fluid having a temperature that ranges between from 130° C. to 300° C.

4. The method of claim 1, wherein the dicyclopentadiene polymeric resin comprises dicyclopentadiene and one or more monomers.

5. The method of claim 4, wherein the monomers comprise at least one of norbornene, ethylene, propylene, styrene, butadiene, cyclopentene, cycloheptene, cyclooctene, or their derivatives.

6. The method of claim 1, further comprising swelling the dicyclopentadiene polymeric resin region of the annular packer swells' in response to exposure to the hydrocarbon fluid.

7. The method of claim 1, wherein the annular packer has a hardness of at least 50 Shore D.

8. The method of claim 7, wherein the annular packer has a hardness of at least 80 Shore D.

9. The method of claim 1, wherein the catalyst comprises up to 10 weight percent of the two-part liquid resin mixture.

10. The method of claim 1, wherein the ambient conditions include room temperature conditions.

11. The method of claim 1, wherein the ambient conditions include a relative humidity of from 20 to 100%.

12. The method of claim 1, wherein the ambient conditions include a barometric pressure of from 975 mbar to 1050 mbar.

13. The method of claim 1, wherein the annular packer has a tensile strength of from 60 and 80 MPa.

14. The method of claim 1, wherein a temperature of the hydrocarbon fluid exceeds a glass transition temperature of the dicyclopentadiene polymeric resin.

15. The method of claim 1, wherein casting the annular packer further comprises combining the two-part liquid resin mixture with fillers or reinforcement fibers, wherein the fillers include one or more of fumed silica, precipitated silica, clay, functionalized clay, talc, functionalized talc, carbon black, graphite, and PTFE, and wherein the reinforcement fibers include one or more of mineral fibers, carbon fibers, glass fibers, and synthetic fibers.

16. The method of claim 15, wherein combining the two-part liquid resin mixture with the reinforcement fibers enhances a swell speed of the annular packer.

17. The method of claim 1, wherein the casting mold includes at least one of an aluminum alloy, a steel alloy, a copper alloy, brass lead, glass, or thermoset resins.

18. The method of claim 1, further comprising adding a barrier coating to the annular packer prior to introducing the annular packer into the wellbore.

19. The method of claim 1, wherein the two-part liquid resin mixture, upon curing, forms a thermoset material.

20. The method of claim 1, wherein the annular packer is cured in less than 4 hours.

* * * * *